United States Patent
Baek et al.

(10) Patent No.: US 9,378,208 B2
(45) Date of Patent: Jun. 28, 2016

(54) CONTENT PROVIDING SYSTEM BASED ON MEDIA PLAYBACK APPARATUS

(75) Inventors: Wonjang Baek, Seongnam-si (KR); John Kim, Seoul (KR); Seong Baek Lee, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 166 days.

(21) Appl. No.: 12/216,192

(22) Filed: Jul. 1, 2008

(65) Prior Publication Data

US 2009/0012967 A1    Jan. 8, 2009

(30) Foreign Application Priority Data

Jul. 6, 2007 (KR) .......... 10-2007-0067844

(51) Int. Cl.
   G06F 17/30    (2006.01)
   H04N 21/258   (2011.01)
   H04N 21/8352  (2011.01)
   H04N 21/432   (2011.01)

(52) U.S. Cl.
   CPC ...... *G06F 17/3002* (2013.01); *H04N 21/25808* (2013.01); *H04N 21/8352* (2013.01); *H04N 21/4325* (2013.01)

(58) Field of Classification Search
   CPC .............. G06F 17/3002; H04N 21/25808; H04N 21/8352; H04N 21/4325
   See application file for complete search history.

(56) References Cited

U.S. PATENT DOCUMENTS

| | | | |
|---|---|---|---|
| 5,493,345 A * | 2/1996 | Ishikawa et al. | 348/700 |
| 7,826,709 B2 * | 11/2010 | Moriya et al. | 715/202 |
| 8,139,926 B2 * | 3/2012 | Hamada et al. | 386/334 |
| 8,185,921 B2 * | 5/2012 | Candelore | 725/20 |
| 8,289,137 B1 * | 10/2012 | Labuda | 340/8.1 |
| 2003/0093810 A1 * | 5/2003 | Taniguchi | 725/112 |
| 2003/0152366 A1 * | 8/2003 | Kanazawa et al. | 386/69 |
| 2003/0161615 A1 * | 8/2003 | Tsumagari et al. | 386/95 |
| 2004/0014422 A1 * | 1/2004 | Kallio | 455/41.1 |
| 2004/0218100 A1 * | 11/2004 | Staker et al. | 348/592 |
| 2005/0091688 A1 * | 4/2005 | Chang et al. | 725/60 |
| 2006/0098936 A1 * | 5/2006 | Ikeda et al. | 386/46 |
| 2006/0136340 A1 * | 6/2006 | Park | 705/52 |
| 2006/0140091 A1 * | 6/2006 | Iwamoto et al. | 369/53.2 |
| 2006/0233236 A1 * | 10/2006 | Labrozzi et al. | 375/240.03 |
| 2007/0008921 A1 * | 1/2007 | Lee et al. | 370/328 |
| 2007/0100966 A1 * | 5/2007 | Peng et al. | 709/219 |

(Continued)

FOREIGN PATENT DOCUMENTS

CN     1630291 A       6/2005
KR     2001-0093577 A  10/2001

(Continued)

OTHER PUBLICATIONS

Korean Office Action issued Feb. 12, 2009, issued to corresponding Korean Application No. 10-2007-0067844.

(Continued)

*Primary Examiner* — Huawen Peng
(74) *Attorney, Agent, or Firm* — Stein IP, LLC

(57) ABSTRACT

A content providing system based on a media playback apparatus capable of reading a content reception information stored in a storage media to provide a multimedia content to a user is disclosed. In accordance with the system, an advertisement or a promotion of a product is possible by distributing a storage media that holds a link to a content providing apparatus to consumers.

11 Claims, 1 Drawing Sheet

(56) References Cited

U.S. PATENT DOCUMENTS

2007/0192834 A1* 8/2007 Song et al. .................. 726/3
2009/0154890 A1* 6/2009 Nakamura et al. .............. 386/46

FOREIGN PATENT DOCUMENTS

| KR | 2001-0107173 A | 12/2001 |
| KR | 10-2004-0062255 A | 7/2004 |
| KR | 10-2005-0036228 A | 4/2005 |
| WO | WO 2009/008638 A3 | 1/2009 |

OTHER PUBLICATIONS

Korean Notice of Allowance issued Nov. 2, 2009, issued to corresponding Korean Application No. 10-2007-0067844.
Chinese Office Action issued Jul. 6, 2011, issued to corresponding Chinese Application No. 200880023427.6.

* cited by examiner

<Prior Art>

CONTENT PROVIDING SYSTEM BASED ON MEDIA PLAYBACK APPARATUS

CROSS-REFERENCE TO RELATED APPLICATIONS

This application claims the benefit of Korean Patent Application No. 10-2007-0067844, filed Jul. 6, 2007 in the Korean Intellectual Property Office, the disclosure of which is incorporated herein by reference.

BACKGROUND OF THE INVENTION

1. Field of the Invention

The present invention relates to a content providing system based on a media playback apparatus, and more particularly to a content providing system based on a media playback apparatus capable of reading a content reception information stored in a storage media to provide a multimedia content to a user.

2. Description of the Related Art

A broadcasting service provider makes a large investment in order to provide a conventional broadcasting service. For instance, the broadcasting service provider should have a permit for broadcasting, equipments and broadcasting networks for a transmission of broadcasting signals. The broadcasting service provider should also have personnel for providing the broadcasting service.

In addition, as a transition from an analog broadcasting to a digital broadcasting is carried out, the broadcasting service provider should make more investments in order to provide the digital broadcasting.

Therefore, the conventional broadcasting service is provided by a large corporation or a public company having a large amount of funds.

Moreover, in order to provide the broadcasting service for specific users other than a general viewer, the broadcasting service provider should make a large investment.

An example of the broadcasting service for the specific users is an internal corporate broadcasting service of a corporation having a plurality of branches.

That is, the internal corporate broadcasting service is for providing the broadcasting service to workers or customers of a bank, a security corporation or a company having a plurality of divisions.

A system for providing the conventional broadcasting service comprises a configuration for creating, operating and transmitting the internal corporate broadcasting, and a configuration for receiving and providing the internal corporate broadcasting.

FIG. 1 is a block diagram illustrating a conventional system for providing an internal corporate broadcasting service.

As shown, the conventional system for providing the internal corporate broadcasting service comprises a head-end system 110 and receivers 130*a* and 130*b*.

For instance, a headquarter has the head-end system 110 for creating, operating and transmitting the internal corporate broadcasting. Branches have the receivers 130*a* and 130*b* for receiving and providing the internal corporate broadcasting.

The receivers 130*a* and 130*b* are generally custom-made in order to receive the internal corporate broadcasting for instance, the receivers 130*a* and 130*b*

In addition, the internal corporate broadcasting service is transmitted through a satellite network 150*a* or a dedicated network 150*b*. In order to provide the broadcasting service, a stable bandwidth should be secured. Therefore, the expensive satellite network 150*a* or a dedicated network 150*b* guaranteeing a QoS is used.

As described above, the broadcasting service provider should make the large investment in order to provide the broadcasting service for the specific users as well as the general broadcasting service.

Therefore, the broadcasting service for the specific users is employed only for some corporations.

SUMMARY OF THE INVENTION

It is an object of the present invention to provide a content providing system based on a media playback apparatus capable of reading a content reception information stored in a storage media to provide a multimedia content to a user.

In accordance with a first aspect of the present invention, there is provided a content providing system comprising: a content providing apparatus for storing a plurality of multimedia contents; a media playback apparatus for establishing a communication connection with the content providing apparatus based on a content reception information read from a storage media, for receiving one of the plurality of multimedia contents and providing the received multimedia content by subjecting the received multimedia content to a signal processing.

Preferably, the content reception information includes a network identification information of the content providing apparatus, and the media playback apparatus establishes the communication connection with the content providing apparatus based on the content providing apparatus based on the network identification information.

Preferably, the content reception information includes an authentication information, wherein the media playback apparatus reads the authentication information and transmits the authentication information to the content providing apparatus, and the content providing apparatus transmits one of the plurality of multimedia contents to the media playback apparatus by verifying the authentication information.

Preferably, the content reception information includes a receiver identification information, wherein the media playback apparatus reads the receiver identification information and transmits the receiver identification information to the content providing apparatus, and the content providing apparatus transmits one of the plurality of multimedia contents to the media playback apparatus by verifying the authentication information.

Preferably, the media playback apparatus stores a user identification information or a device identification information of the media playback apparatus, and the content providing apparatus transmits one of the plurality of multimedia contents to the media playback apparatus by verifying the user identification information or the device identification information.

Preferably, the content providing apparatus classifies and stores the plurality of multimedia contents based on a user profile, and one of the plurality of multimedia contents to be transmitted to the media playback apparatus is selected based on the user identification information.

Preferably, the content providing apparatus classifies and stores the plurality of multimedia contents based on a user profile, and one of the plurality of multimedia contents to be transmitted to the media playback apparatus is selected based on the device identification information.

Preferably, the content providing apparatus classifies and stores the plurality of multimedia contents based on a service providing area, and one of the plurality of multimedia contents to be transmitted to the media playback apparatus is selected based on the receiver identification information.

Preferably, the content providing apparatus maintains a list of the plurality of multimedia contents provided according to a time for providing the plurality of multimedia contents, and one of the plurality of multimedia contents to be transmitted to the media playback apparatus is selected based on the list.

Preferably, the content reception information includes an identification information of one of the plurality of multimedia contents, and one of the plurality of multimedia contents to be transmitted to the media playback apparatus is selected based on the identification information.

Preferably, the storage media includes a disk media, and the media playback apparatus provides the multimedia content stored in the disk media by subjecting the multimedia content stored in the disk media to the signal processing.

Preferably, the disk media supports one of a DVD specification, a Blu-ray specification and a HD-DVD specification.

Preferably, the storage media stores a user interface program, and the media playback apparatus executes the user interface program and receives the selected multimedia content from the content providing apparatus based on a user input received through user interface program.

Preferably, at least one of the plurality of multimedia contents includes a data application.

Preferably, the content providing apparatus stores a scene resource data obtained by dividing the data application according to each scene, and the media playback apparatus receives and provides the scene resource data.

Preferably, the scene resource data comprises an execution code and a resource data for executing the data application according to each scene.

DETAILED DESCRIPTION OF THE INVENTION

The present invention will now be described in detail with reference to the accompanied drawings. The interpretations of the terms and wordings used in Description and Claims should not be limited to common or literal meanings. The embodiments are provided for the skilled in the art to more completely understand the present invention.

Figure 1:
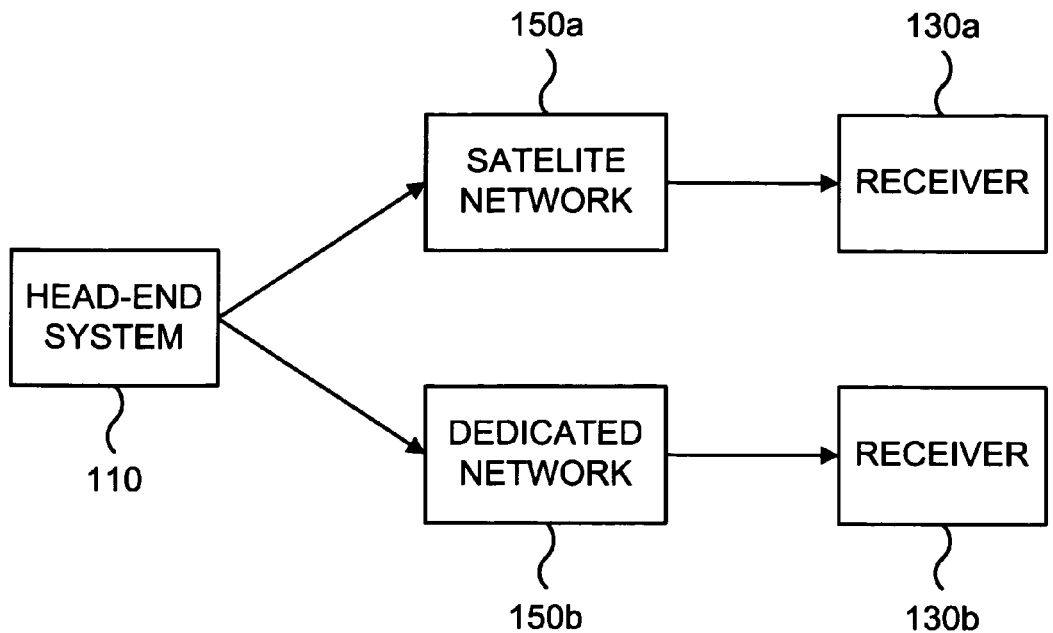
FIG. 1 is a block diagram illustrating a conventional system for providing an internal corporate broadcasting service.
Figure 2:
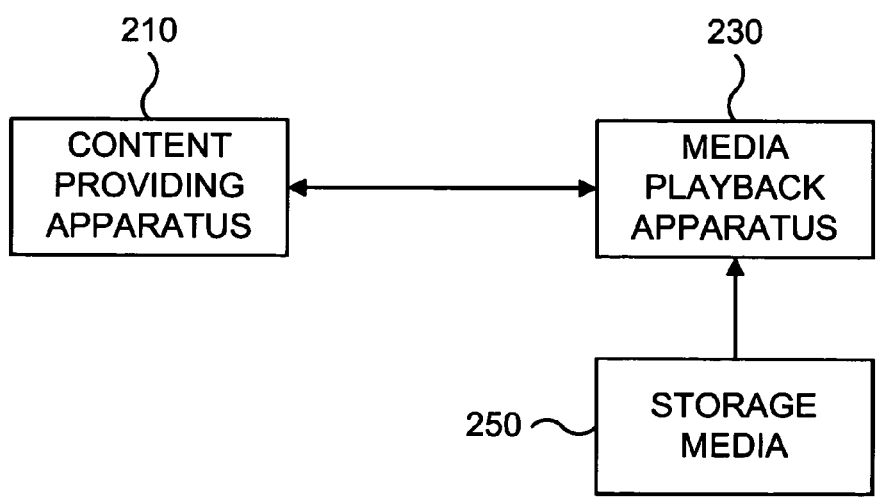
FIG. 2 is a block diagram illustrating a content providing system based on a media playback apparatus in accordance with the present invention.

FIG. 2 is a block diagram illustrating a content providing system based on a media playback apparatus in accordance with the present invention.

As shown, the content providing system based on the media playback apparatus comprises a content providing apparatus 210 and a media playback apparatus 230.

The content providing apparatus 210 stores a plurality of multimedia contents.

The content providing apparatus 210 provides the plurality of multimedia contents to the media playback apparatus 230 according to a request from the media playback apparatus 230.

The media playback apparatus 230 establishes a communication connection with the content providing apparatus 210 based on a content reception information read from a storage media 250.

The content reception information is an information required for the media playback apparatus 230 to receive the multimedia contents from the content providing apparatus 210.

The media playback apparatus 230 receives the multimedia content selected from the plurality of multimedia contents stored in the content providing apparatus 210 through the communication connection. In addition, the media playback apparatus 230 provides the multimedia content by subjecting the received multimedia content to a signal processing. The media playback apparatus 230 provides the received multimedia content through a display apparatus arranged to correspond to the media playback apparatus 230.

The storage media 250 may satisfy a disk media storage specification such as a DVD specification, a Blu-ray specification and a HD-DVD specification.

When the storage media 250 is a disk media, the media playback apparatus 230 may be an apparatus capable of processing a multimedia content data stored in the disk media. That is, the media playback apparatus 230 may be a DVD player, a Blu-ray player or a HD-DVD player.

Alternately, the storage media 250 may be a non-volatile storage media such as a USB storage or a hard disk. When the storage media 250 is the non-volatile storage media such as the USB storage and the hard disk, the media playback apparatus 230 may be an apparatus capable of processing the multimedia content data stored in the non-volatile storage media. For instance, the media playback apparatus 230 may be an apparatus for reproducing the multimedia content stored in the hard disk such as a DivX player.

However, it is preferable that the storage media 250 in the content providing system based on the media playback apparatus satisfies the disk media storage specification such as the DVD specification, the Blu-ray specification and the HD-DVD specification. In addition, it is preferable that the media playback apparatus 230 is a disk media playback apparatus such as the DVD player, the Blu-ray player and the HD-DVD player.

Hereinafter, the present invention is described in detail based on an assumption that the storage media 250 satisfies the disk media storage specification and the media playback apparatus 230 is the disk media playback apparatus.

The content providing system based on the media playback apparatus in accordance with the present invention is characterized in that the multimedia content may be provided to the user without using a conventional head-end system or a dedicated receiver.

That is, in accordance with the content providing system based on the media playback apparatus of the present invention, the media playback apparatus 230 is used as the receiver and the content providing apparatus 210 connected to the media playback apparatus 230 through the Internet is used as the head-end system.

Contrary to the conventional technology requiring a complex configuration for broadcasting, a broadcasting service for the user may be embodied in a manner that the multimedia contents is stored in the content providing apparatus 210, and the media playback apparatus 230 connects to the content providing apparatus 210 via a communication network to receive and playback the multimedia contents in accordance with the present invention.

In addition, since a general communication network such as a VDSL, a FTTH and a FTTC may be used, the content providing system based on the media playback apparatus in accordance with the present invention is advantageous in that a dedicated communication network is not required. That is, since the content providing system based on the media playback apparatus in accordance with the present invention uses the general communication network such as the VDSL, the FTTH and the FTTC capable of providing a bandwidth more than 2 Mbps to provide the multimedia contents, the dedicated communication network such as a internal corporate broadcasting system is not required.

A reception of the multimedia content based on the content reception information is described below in detail.

The content reception information is stored in the storage media 250. The media playback apparatus 230 reads the content reception information.

The content reception information may include a network identification information of the content providing apparatus 210.

After the media playback apparatus 230 reads the network identification information, the media playback apparatus 230 establishes a communication connection with the content providing apparatus 210.

The communication between the content provider 210 and the media playback apparatus 230 may be carried out by a dedicated protocol. Accordingly, the dedicated protocol may be stored in the storage media 250. The media playback apparatus may execute the dedicated protocol. stored in the storage media 250 to establish the communication connection with the content provider 210.

On the other hand, the content reception information may include an authentication information for a user verification during establishing the communication connection. For instance, in case of the internal corporate broadcasting service, the multimedia content should be provided to a specific user. Accordingly, the content providing apparatus 210 may provide the multimedia content only when the user is verified by verifying the authentication information.

The media playback apparatus 230 reads the authentication information from the storage media 250 and transmits the same to the content providing apparatus 210 for the verification.

On the other hand, the content reception information may include an information for receiving a personalized multimedia content from the content providing apparatus 210, i.e. a receiver identification information.

For instance, when providing the internal corporate broadcasting service to each branch, different multimedia contents may be provided according to a characteristic of the branch. The multimedia content may be provided according to a personal identification information of the user. The receiver identification information represents an identification information of a user group or the user.

In order to provide the personalized multimedia content, the storage media 250 may store the content reception information including a user identification information. The media playback apparatus 230 may read the receiver identification information from the storage media 250 and transmits the same to the content providing apparatus 210. The content providing apparatus 210 verifies the receiver identification information, selects the multimedia content corresponding to the receiver identification information from the plurality of stored the multimedia contents, and transmits the selected multimedia content to the media playback apparatus 230.

The media playback apparatus 230 may store the user identification information of the user of the media playback apparatus 230 or a device identification information of the media playback apparatus 230. The user identification information is similar to the receiver identification information stored in the storage media 250. However, the receiver identification information cannot be configured in advance when the multimedia content is provided to an unspecified user.

Therefore, the content providing apparatus 210 may select the multimedia content using the user identification information stored in the media playback apparatus 230.

The device identification information is the identification information of the media playback apparatus 230.

The media playback apparatus 230 transmits the user identification information or the device identification information to the content providing apparatus 210. the content providing apparatus 210 verifies the user identification information or the device identification information, selects the multimedia content corresponding to the user identification information or the device identification information from the plurality of stored the multimedia contents, and transmits the selected multimedia content to the media playback apparatus 230.

Providing the multimedia content by the content providing apparatus 210 is described below in more detail.

The content providing apparatus 210 stores the plurality of multimedia contents.

When the plurality of multimedia content is stored, the content providing apparatus 210 may classify and store plurality of the multimedia content according to various criteria, facilitating the selection of the multimedia content.

First, the content providing apparatus 210 may classify and store the plurality of multimedia contents according to a user profile.

That is, the multimedia content is stored according to the user group.

For instance, in case of internal corporate broadcasting service, the multimedia content is configured to be suitable for a customer at a window of the branch, and the multimedia content is configured to provide corporate related news or information for an department of operation.

When the multimedia contents are stored according to the user group, the content providing apparatus 210 selects, based on a content receiving information transmitted from the media playback apparatus 230, more particularly, the receiver identification information read from the storage media 250 by the media playback apparatus 230 or the user identification information or the device identification information stored in the media playback apparatus 230, the multimedia content from the plurality of multimedia contents suitable for the receiver identification information, the user identification information or the device identification information.

In addition, the content providing apparatus 210 may classify and store the multimedia content based on a service providing region of the multimedia content. For instance, the content providing apparatus 210 may classify profiles into a region A and a region B and stores the plurality of the multimedia contents according to the profiles.

When the multimedia contents are stored according to the service providing region, the content providing apparatus 210 selects, based on the content receiving information transmitted from the media playback apparatus 230, more particularly, the device identification information stored in the media playback apparatus 230, the multimedia content suitable for the region corresponding to the device identification information from the plurality of multimedia contents classified according to the service providing region.

Through above-described configuration, the content providing apparatus 210 may provide the multimedia content suitable for the characteristic of the region where the media playback apparatus 230 is located.

In addition, the content providing apparatus 210 may maintain a list of the plurality of multimedia contents provided according to a time. That is, the content providing apparatus 210 generates and maintains the list of the multimedia contents to be transmitted to the media playback apparatus 230 according to the time to correspond to a programming of a broadcasting service.

For instance, in case of the internal corporate broadcasting service of a security corporation, the content providing apparatus 210 maintains the list of the multimedia content to provide the multimedia content related to a stock market when open, and the multimedia content related to an analysis of a security or other financial information when closed.

When the list is maintained, the content providing apparatus 210 selects and transmits the corresponding multimedia content in the list based on a current time to the media playback apparatus 230.

Moreover, the content providing apparatus 210 may transmit the multimedia content based on an identification information of the multimedia content. The content providing apparatus 210 maintains the identification information for the plurality of multimedia contents. The content reception information includes the identification information of one of the plurality of multimedia contents. The content providing apparatus 210 selects, based on the content receiving information transmitted from the media playback apparatus 230, more particularly, the identification information of the multimedia content read from the storage media 250 by the media playback apparatus 230, the multimedia content corresponding to the identification information from the plurality of multimedia contents and transmits the selected multimedia content to the media playback apparatus 230.

As described above, the media playback apparatus 230 of the content providing system based on the media playback apparatus in accordance with the present invention reads the content reception information from the storage media 250 and establishes the communication connection with the content providing apparatus 210 based on the same.

In order to facilitate the communication connection, the storage media 250 may include a user interface program. The media playback apparatus 230 reads and executes the user interface program stored in the storage media 250. the user interface program is a program that is automatically executed when the storage media 250 is inserted into the media playback apparatus 230 or a program that is executed when desired by a user through a button input.

When the user interface program is executes, the media playback apparatus 230 provides a user interface for the communication connection with the content providing apparatus 210 and connects to the content providing apparatus 210 based on a user input corresponding to the user interface. The user may carry out the selection of the multimedia content through the user interface program.

The multimedia content provided by the content providing apparatus 210 may include a data application. For instance, the data application is supported when the media playback apparatus 230 supports HDi (High Definition interactive) or BD-J. HDi is a standard specification for a data application service and an advanced user menu function supported by HD-DVD. BD-J is a standard specification for a data application service supported by Blu-ray disk. the media playback apparatus 230 may embody and provide the data application using an interactive service specification for a disk media such as HDi or BD-J.

In order to improve an efficiency when providing the data application, the content providing apparatus 210 may store a scene resource data divided according to scenes. That is, when a size of the data application is excessively large, it is difficult for the content providing apparatus 210 to transmit the data application to the media playback apparatus 230 or for the media playback apparatus 230 to process the data application. Therefore, the content providing apparatus 210 divides and stores the data application according to scenes.

The scene resource data is for a scene-by-scene execution of the data application and may include an execution code that may be executed scene-by-scene and a resource data. The resource data may include a background image, an image of a button of the user interface and a data such as a text.

When the data application is stored in the content providing apparatus 210 in a form of the scene resource data, the content providing apparatus 210 transmits the data application to the media playback apparatus 230 in a unit of the scene resource data. The media playback apparatus 230 provides the data application by receiving executing the scene resource data. When the scene resource data is employed, a limitation of a size of the data application executable in the media playback apparatus 230 and a resource of the media playback apparatus 230 may be minimized. Therefore, the data application having various functions may be provided.

In accordance with the present invention, the multimedia content may be provided to the user via the media playback apparatus 230. In addition, since the multimedia content may be provided using the content reception information stored in the storage media 250, the present invention is applicable to various fields. For instance, when a company which markets to consumers distributes the storage media 250 that holds a link to the content providing apparatus 210 of the company, the consumers may receive the multimedia content provided by the company by inserting the storage media 250 into the media playback apparatus 230 at home. Therefore, an advertisement or a promotion of a product is facilitated. In addition, the present invention may be applied to a remote education or public relations as well as the advertisement or the promotion.

While the present invention has been particularly shown and described with reference to the preferred embodiment thereof, it will be understood by those skilled in the art that various changes in form and details may be effected therein without departing from the spirit and scope of the invention.

What is claimed is:

1. A content providing system comprising:
  a content providing apparatus configured to store therein a plurality of multimedia contents including a plurality of scene resource data obtained by dividing a data application according to scenes, wherein the data application has a plurality of scenes for interactive service and is transmitted in a unit of the scene resource data, wherein each of the plurality of the scene resource data is configured for a scene-by-scene execution of the data application and includes an execution code that is independently executed scene-by-scene and a resource data; and
  a media playback apparatus configured to establish a communication connection with the content providing apparatus based on content reception information read by the media playback apparatus from external storage media, which is external to and connected to the media playback apparatus, configured to receive one of the plurality of multimedia contents and to provide the received multimedia content by subjecting the received multimedia content to signal processing, and configured to receive and provide the scene resource data by executing the scene resource data which contains the execution code that is independently executed scene-by-scene,
  wherein the media playback apparatus stores user identification information or device identification information of the media playback apparatus, and
  wherein the content providing apparatus transmits one of the plurality of multimedia contents to the media playback apparatus by verifying the user identification information and the device identification information, wherein the content providing apparatus classifies and stores the plurality of multimedia contents based on a user profile, and wherein one of the plurality of multimedia contents to be transmitted to the media playback apparatus is selected based on the user identification information, wherein the content providing apparatus classifies and stores the plurality of multimedia contents based on a service providing area, and wherein one of the plurality of multimedia contents to be transmitted to the media playback apparatus is selected based on the device identification information.

2. The system in accordance with claim 1, wherein the content reception information includes network identification information of the content providing apparatus, and wherein the media playback apparatus establishes the communication connection with the content providing apparatus based on the network identification information.

3. The system in accordance with claim 1, wherein the content reception information includes authentication information, wherein the media playback apparatus reads the authentication information and transmits the authentication information to the content providing apparatus, and wherein the content providing apparatus transmits one of the plurality of multimedia contents to the media playback apparatus by verifying the authentication information.

4. The system in accordance with claim 1, wherein the content reception information includes receiver identification information, wherein the media playback apparatus reads the receiver identification information and transmits the receiver identification information to the content providing apparatus, and wherein the content providing apparatus transmits one of the plurality of multimedia contents to the media playback apparatus by verifying the receiver identification information.

5. The system in accordance with claim 4, wherein the content providing apparatus classifies and stores the plurality of multimedia contents based on a user profile, and wherein one of the plurality of multimedia contents to be transmitted to the media playback apparatus is selected based on the receiver identification information.

6. The system in accordance with claim 1, wherein the content providing apparatus maintains a list of the plurality of multimedia contents provided according to a time for providing the plurality of multimedia contents, and wherein one of the plurality of multimedia contents to be transmitted to the media playback apparatus is selected based on the list.

7. The system in accordance with claim 1, wherein the content reception information includes identification information of one of the plurality of multimedia contents, and wherein one of the plurality of multimedia contents to be transmitted to the media playback apparatus is selected based on the identification information.

8. The system in accordance with claim 1, wherein the storage media includes disk media, and wherein the media playback apparatus provides the multimedia content stored in the disk media by subjecting the multimedia content stored in the disk media to the signal processing.

9. The system in accordance with claim 8, wherein the disk media supports one of a DVD specification, a Blu-ray specification and a HD-DVD specification.

10. The system in accordance with claim 1, wherein the storage media stores a user interface program, and wherein the media playback apparatus executes the user interface program and receives the selected multimedia content from the content providing apparatus based on a user input received through user interface program.

11. The system in accordance with claim 3, wherein the resource data included in the scene resource data comprises a background image, an image of a button of the user interface, and a text data.

* * * * *